(12) United States Patent
Blewett et al.

(10) Patent No.: US 10,305,890 B2
(45) Date of Patent: *May 28, 2019

(54) SYSTEM AND METHOD FOR PROVIDING A ONE-TIME KEY FOR IDENTIFICATION

(71) Applicant: AT&T Intellectual Property I, L.P., Atlanta, GA (US)

(72) Inventors: Charles D. Blewett, San Diego, CA (US); Megan Blewett, San Diego, CA (US); Juan A. Garay, Guttenberg, NJ (US); Robert C. Haarde, Sudbury, MA (US); Thomas Killian, Brookside, NJ (US); Yitzhak H. Mandelbaum, Pittsburgh, PA (US); Simon Urbanek, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/149,620

(22) Filed: May 9, 2016

(65) Prior Publication Data

US 2017/0019398 A1    Jan. 19, 2017

Related U.S. Application Data

(63) Continuation of application No. 14/282,314, filed on May 20, 2014, now Pat. No. 9,380,043, which is a
(Continued)

(51) Int. Cl.
*H04L 29/06* (2006.01)
*H04L 9/08* (2006.01)
(Continued)

(52) U.S. Cl.
CPC .......... *H04L 63/0838* (2013.01); *H04L 9/083* (2013.01); *H04L 9/0869* (2013.01);
(Continued)

(58) Field of Classification Search
None
See application file for complete search history.

(56) References Cited

U.S. PATENT DOCUMENTS

2001/0010045 A1    7/2001  Stefik et al.
2002/0007453 A1    1/2002  Nemovicher
(Continued)

FOREIGN PATENT DOCUMENTS

WO    2010/004576       1/2010
WO    WO-2010004576 A1 *  1/2010  ............. G06Q 20/02

OTHER PUBLICATIONS

US. Appl. No. 12/646,419, filed Dec. 23, 2009.

*Primary Examiner* — William J. Goodchild
(74) *Attorney, Agent, or Firm* — Akerman LLP; Michael K. Dixon; Mammen (Roy) P. Zachariah, Jr.

(57) ABSTRACT

A server includes a key generator and an authenticator. The key generator is configured to receive a request for a first key from a worker device, to create the first key that is associated with a worker, and to transmit the first key to the worker device. The authenticator is in communication with the key generator, the authenticator is configured to receive a second key and identification details from a customer device, to transmit the identification details to the worker device, to receive acknowledgment of the identification details from the worker device, and to authenticate the second key and the identification details with the customer device.

20 Claims, 5 Drawing Sheets

Related U.S. Application Data continuation of application No. 12/695,599, filed on Jan. 28, 2010, now Pat. No. 8,732,460.

(51) Int. Cl.
    *H04L 9/32*     (2006.01)
    *H04W 12/04*     (2009.01)
    *H04W 12/06*     (2009.01)

(52) U.S. Cl.
    CPC ............ *H04L 9/321* (2013.01); *H04L 9/3228* (2013.01); *H04L 63/067* (2013.01); *H04L 63/08* (2013.01); *H04W 12/04* (2013.01); *H04W 12/06* (2013.01); *H04L 2209/805* (2013.01)

(56) References Cited

U.S. PATENT DOCUMENTS

| | | |
|---|---|---|
| 2002/0008136 A1 | 1/2002 | Eguthi et al. |
| 2003/0047613 A1 | 3/2003 | Funamoto et al. |
| 2003/0144035 A1* | 7/2003 | Weinblatt ............... G06Q 30/02 455/566 |
| 2003/0182242 A1* | 9/2003 | Scott ...................... G06Q 20/12 705/65 |
| 2004/0020988 A1 | 2/2004 | Omori |
| 2004/0103023 A1 | 5/2004 | Irwin et al. |
| 2004/0107170 A1* | 6/2004 | Labrou .................. G06Q 20/02 705/64 |
| 2004/0148253 A1* | 7/2004 | Shin ....................... G06Q 20/04 705/39 |
| 2005/0187882 A1* | 8/2005 | Sovio ..................... G06Q 20/20 705/64 |
| 2006/0016878 A1 | 1/2006 | Singer et al. |
| 2006/0190351 A1 | 8/2006 | Dennis |
| 2006/0235795 A1* | 10/2006 | Johnson ................ G06Q 20/02 705/44 |
| 2007/0233035 A1 | 10/2007 | Wehba et al. |
| 2008/0201264 A1 | 8/2008 | Brown et al. |
| 2008/0210754 A1 | 9/2008 | Lovett |
| 2009/0173779 A1 | 7/2009 | Szesko et al. |
| 2009/0307492 A1 | 12/2009 | Cao et al. |
| 2009/0313472 A1 | 12/2009 | Guccione et al. |
| 2009/0327704 A1 | 12/2009 | Hatelid |
| 2009/0327737 A1 | 12/2009 | Hsu et al. |
| 2010/0185506 A1* | 7/2010 | Wolff .................... G06Q 30/02 705/14.31 |
| 2011/0078025 A1 | 3/2011 | Shrivastav |

\* cited by examiner

SYSTEM AND METHOD FOR PROVIDING A ONE-TIME KEY FOR IDENTIFICATION

CROSS-REFERENCES TO RELATED APPLICATIONS

This application claims priority to and is a continuation of U.S. patent application Ser. No. 14/282,314, filed May 20, 2014, which is a continuation of and claims priority to U.S. patent application Ser. No. 12/695,599, filed Jan. 28, 2010, now U.S. Pat. No. 8,732,460, which are both hereby incorporated by reference in their entireties.

FIELD OF THE DISCLOSURE

The present disclosure generally relates to communications networks, and more particularly relates to a system and a method for providing a one-time key for identification.

BACKGROUND

Companies that provide products or services to a specific customer location can have field workers that travel to the customer location to install equipment, provide repairs, or otherwise maintain the products provided to the customer. The field workers may also need to provide identification that they are authorized to work at the customer location or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
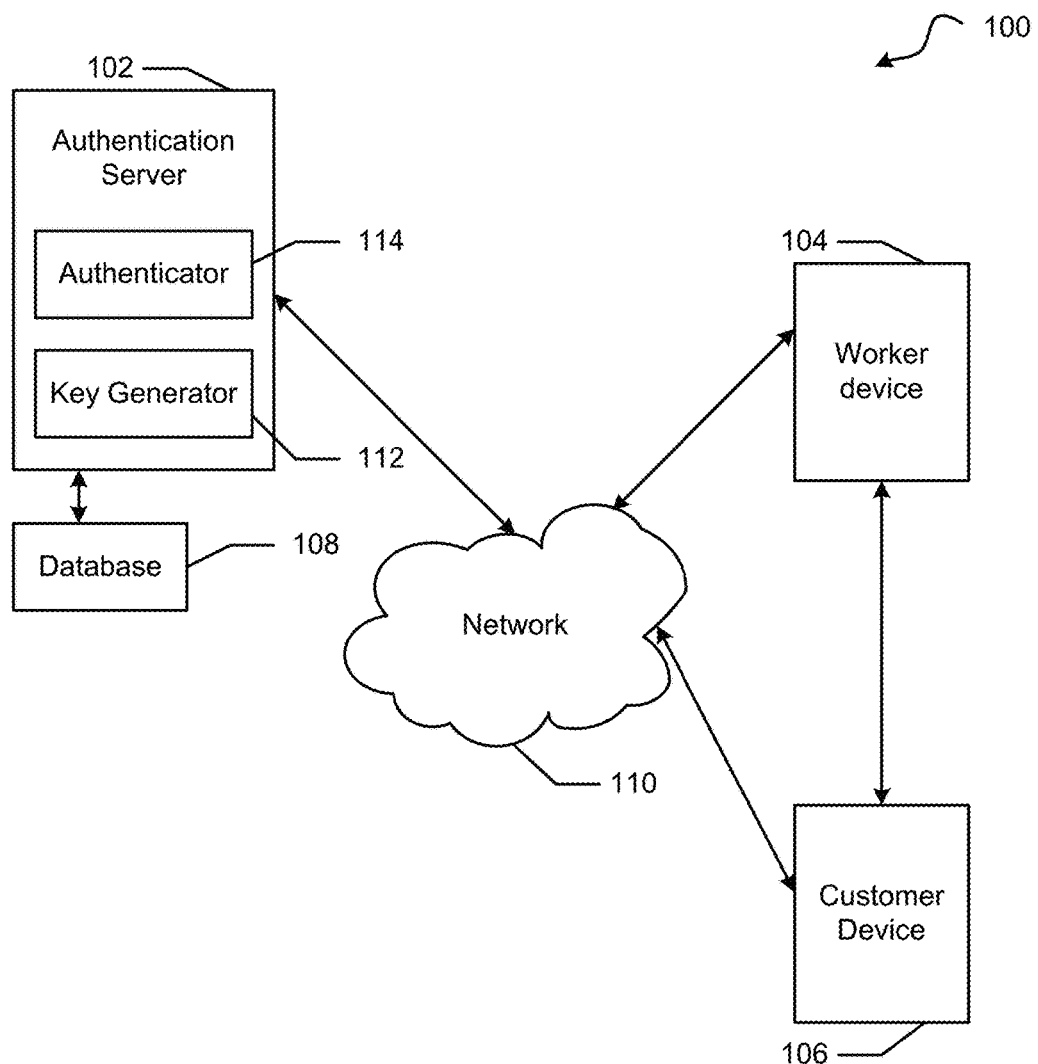
FIG. 1 is a block diagram of a communications network.

FIG. 1 shows a communication system 100 including an authentication server 102, a worker device 104, a customer device 106, a database 108, and a network 110. The authentication server 102 is in communication with the worker device 104 and with the customer device 106 via the network 110, and with the database 108. The worker device 104 is in communication with the customer device 106. The authentication server 102 includes a key generator 112 and an authenticator 114, which can be implemented in hardware, software, or any combination thereof. The key generator 112 and the authenticator 114 may include one or more computer systems. When the key generator 112 and the authenticator 114 include more than one computer system, the functions of the key generator and the authenticator can be distributed across the multiple computer systems in a symmetric manner, such that each computer system performs the same type of tasks, or in an asymmetric manner, such that two computer systems of the authenticator may perform different tasks.

The worker device 104 can be any device capable of communicating via a barcode, a radio frequency identification (RFID) via Near Field Communication (NFC), via a wireless protocol, or the like, such as a cellular telephone, a personal digital assistant, or the like. The worker device 104 can have software installed thereon which is used to perform the identification. In an embodiment, the worker device 104 is not required to have additional hardware components. However in an alternate embodiment, the worker device 104 can have a hardware component installed therein or a module connected thereto to perform the identification. The customer device 106 can be any device capable of communicating via a barcode, a RFID via NFC, via a wireless protocol, or the like, such as a cellular telephone, a personal digital assistant, or the like. The customer device 106 may also have software installed thereon to perform the identification. However, like the worker device 104, the customer device 106 may also include further hardware and/or modules to perform the identification.

The network 110 can enable mobile devices to connect thereto so that mobile services may be provided. The network 110 can include a variety of different such as a Global System for Mobile communications (GSM) network, a Virtual Private Network (VPN) such as over a tethered network, or the like. In another embodiment, the network 110 can be any Transmission Control Protocol/Internet Protocol (TCP/IP) network, which provides the worker device 104 and other component of the system to run the Hypertext Transfer Protocol Secure (HTTPS) protocol.

A worker can utilize the worker device 104 to receive a one-time key for identification of the worker. The one-time key is preferably associated with the worker. The one-time key can be a long-enough binary string or the like, such that the one-time key is infeasible to guess, and the one-time key is amenable for translation into a graphical representation for presentation by the worker device 104. The one-time key can be presented by the worker device 104 as a barcode, a RFID via NFC, via a wireless protocol, or the like. In an embodiment, the worker can be required to input authenticating information into the worker device 104 for transmission to the authentication server 102 to activate the retrieval of the one-time key from the authentication server. The authenticating information may include information such as a username and password, biometric information such as a finger print or retinal scan, or the like. The transmission of the authenticating information can be via a secure protocol to prevent other individuals to get the authenticating information of the worker during the transmission of the information to the authentication server 102.

When the worker has input the authenticating information, the worker device 104 can transmit the authenticating information to the authentication server 102 for verification, and can then request the one-time key from the authentication server. In an embodiment, the worker device 104 can also transmit an International Mobile Equipment Identity (IMEI) of the worker device, a Mobile Subscriber Integrated Services Digital Network (MSISDN) Identification from the GSM Subscriber Identity Module (SIM) card, or the like along with the authenticating information to further authenticate the worker device with the authentication server 102. The additional identifications of the worker device 104 can add additional security to the request for the one-time key. The key generator 112 can generate the one-time key that is associated with the worker and with the worker device 104.

The key generator 112 can generate the one-time key by utilizing a cryptographically strong pseudo-random number generator, or a keyed pseudo-random function applied to a suitable argument, in the key generator to create a number sequence. When the one-time key is generated, the key generator 112 can store the one-time key in the database 108 for a limited amount of time, such as five minutes, ten minutes, or the like. The authentication server 102 can then transmit the one-time key to the worker device 104 over a secure (encrypted and authenticated) connection within the network 110. In an embodiment, the authentication server 102 can also transmit a token along with the one-time key to further authenticate the one-time key with the worker device 104. The token can be held in secret between the authentication server 102 and the worker device 104 as an additional level of security for the transmission of the one-time key. When the worker device 104 receives the one-time key, the worker device can present the one-time key on a display 200 as shown in FIG. 2.

Figure 2:
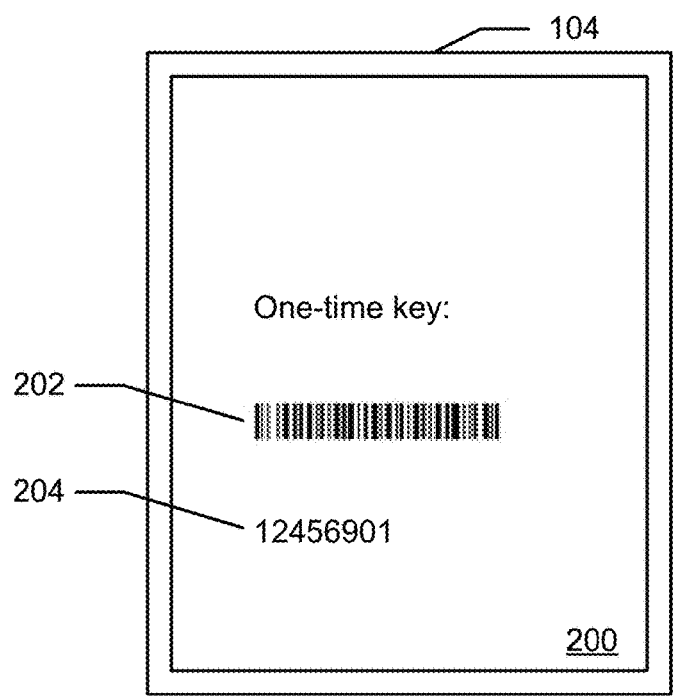
FIG. 2 is an exemplary embodiment of a worker device.

FIG. 2 shows an exemplary embodiment of the worker device 104 including the display 200. An exemplary output of the display 200 can include a barcode 202 and a number sequence 204 each associated with the one-time key. The barcode 202 can be displayed on the display 200 of the worker device 104, such that the resolution of the barcode image can allow the barcode to be scanned by the customer device 106. The worker can then provide the barcode 202 on the display 200 to the customer requesting identification of the worker. The customer requesting identification of the worker can use the customer device 106 to scan the barcode 202, such that the one-time key is input into the customer device. However, if the customer device 106 cannot scan the barcode 202, the number sequence 204 can be manually input into the customer device to provide the one-time key to the customer device. In another embodiment, the one-time key can be presented to the customer device 106 as an RFID via NFC, wireless protocol, or the like.

Referring again to FIG. 1, the customer device 106 can initiate communication with the authentication server 102 via the network 110. In an embodiment, the customer device 116 can transmit a authenticating information to the authentication server 102 to authenticate the customer device with the authentication server. In an embodiment, the customer device 106 can also transmit an IMEI of the customer device, a MSISDN Identification from the GSM SIM card of the customer device, or the like along with the one-time key to further authenticate the customer device with the authentication server 102. The additional identifications of the customer device 106 can add additional security to the transmission of the one-time key to the authentication server 102. The customer device 106 can then transmit the one-time key and any associated information to the authentication server 102 for verification by the authenticator 114. The information associated with the one-time key can be a type of service to be provided or the like. The authenticator 114 can compare the one-time key received from the customer device 106 with each one-time key stored in the database 108. If the one-time key received from the customer device 106 matches one of the stored one-time keys, the authenticator 114 can verify the one-time key. The authentication server 102 can then determine what type of information is included in the information associated with the one-time key.

If the authentication server 102 determines that the information associated with the one-time key is a type of service, the authentication server can send an acknowledgment request the to the work device 104. The acknowledgment request can be utilized to verify that the worker has the worker device 104 in his or her hand, the location of the worker such as at the resident's address, or the like. The acknowledgment request can be displayed on the worker device 104. The worker can then either select or not select the acknowledgment request to verify the information received from the authentication server 102. When the acknowledgment request is selected, the worker device 104 can send an acknowledgment to the authentication server 104, which in turn can send the verification of the one-time key to the customer device 106. The verification of the one-time key informs the customer requesting identification of the worker that the worker is authorized to perform the type of service. However, the verification of the one-time key preferably does not reveal the identity of the worker.

The one-time keys can be deleted from the database 108 after the specific amount of time. Thus, if the customer device 106 sends the one-time key for verification after the specific amount of time, the authenticator 114 can determine that one-time key is invalid. Additionally, the one-time keys are preferably not stored at the worker device 104 and are preferably only presented for the specific amount of time. Thus, if the worker does not have the one-time key scanned or otherwise input into the customer device 106 within the specific amount of time, the worker preferably has to request a new one-time key from the authentication server 102. The removal of the one-time key from the database 108 and the specific amount of time that the one-time key is available on the worker device 104 inhibits an unauthorized person from retrieving and utilizing a one-time key from the authentication server 102.

Figure 3:
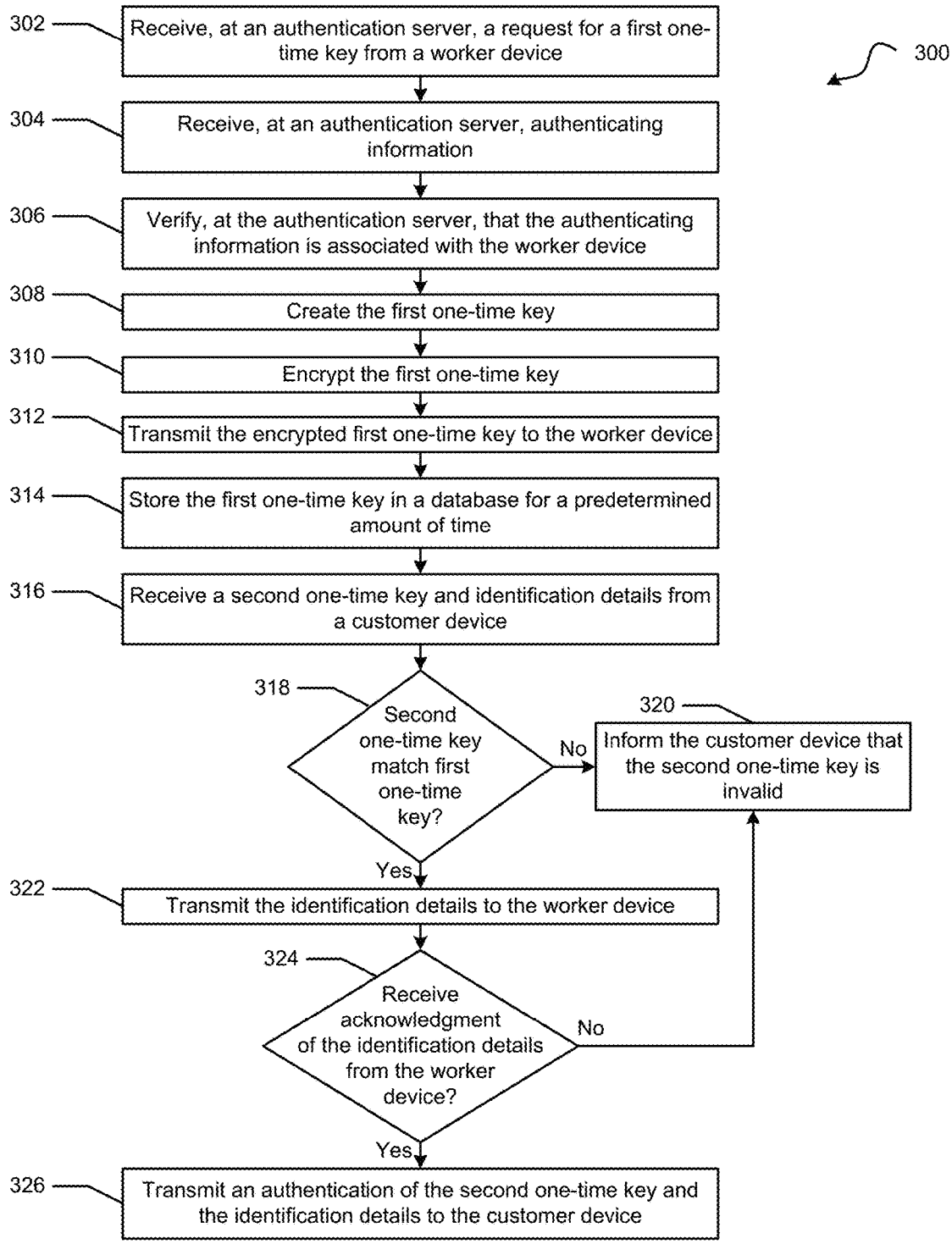
FIG. 3 is a flow diagram of a method for providing an one-time key for identification.

FIG. 3 shows a flow diagram of a method 300 for providing a one-time key for identification. At block 302, a request for a first one-time key is received from a worker device at an authentication server. Authenticating information is received at block 304. At block 306, the authenticating information is verified at the authentication server as being associated with a worker. The first one-time key is created at block 308. The first one-time key is associated with the worker. At block 310, the first one-time key is encrypted. The encrypted first one-time key is transmitted to the worker device at block 312. At block 314, the first one-time key is stored in a database for a predetermined amount of time. The predetermined amount of time can be five minutes, ten minutes, or the like.

A second one-time key and identification details are received from a customer device at block 316. At block 318, a determination is made whether the second one-time key matches the first one-time key. If the second one-time key does not match the first one-time key, the customer device is informed that the second one-time key is invalid at block 320. If the second one-time key matches the first one-time key, the identification details are transmitted to the worker device at block 322. The identification details can include a type of service to be performed or the like. At block 324, a determination is made whether an acknowledgment of the identification details is received. If the acknowledgment of the identification details is not received, the customer device is informed that the second one-time key is invalid at block 320. If the acknowledgment of the identification details is received, an authentication of the second one-time key and the identification details are transmitted the customer device at block 326.

Figure 4:
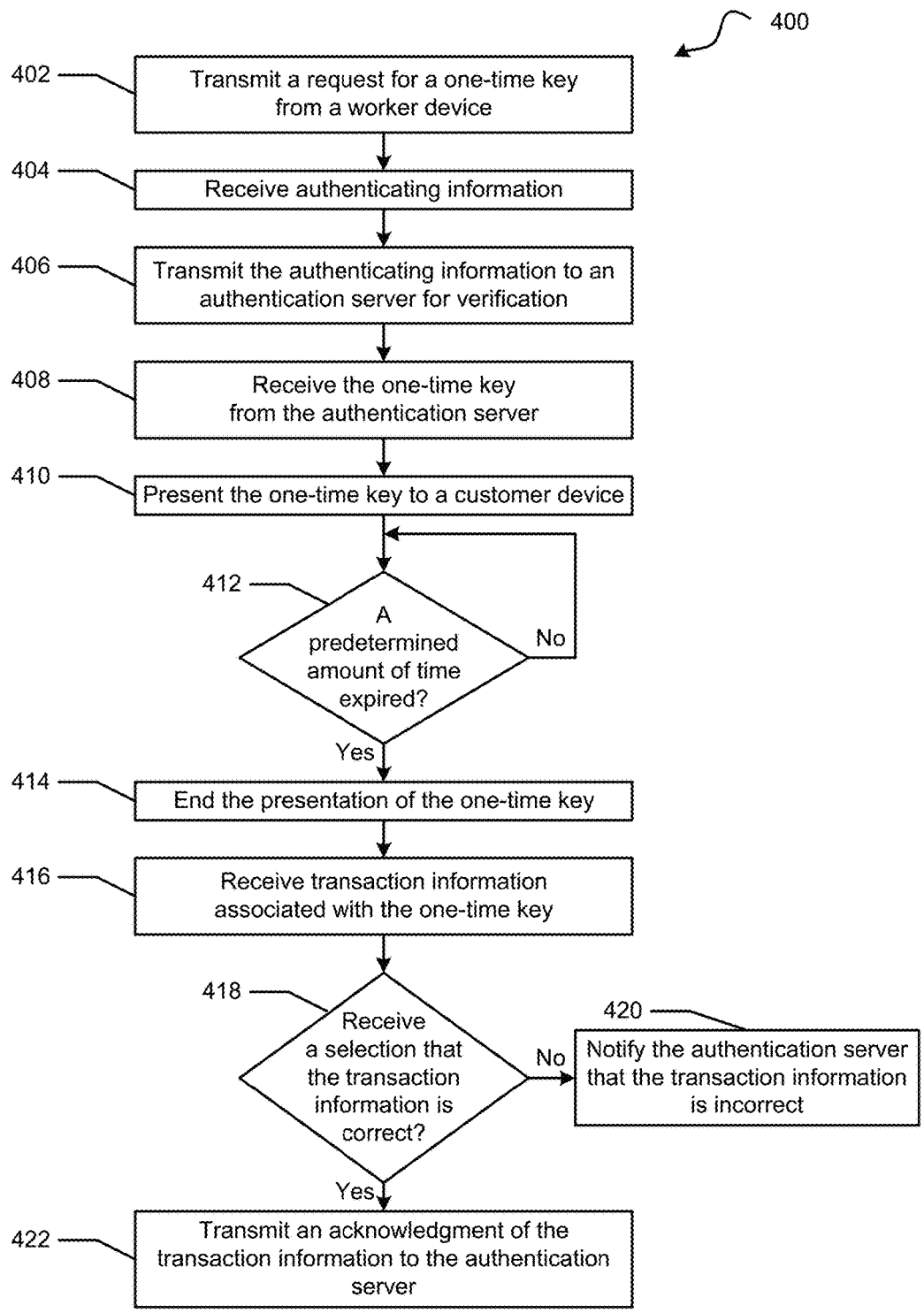
FIG. 4 is a flow diagram of a method for presenting the one-time key for identification.

FIG. 4 shows a flow diagram of a method 400 for displaying the one-time key for identification. At block 402, a request for a one-time key is transmitted to an authentication server by a worker device. Authenticating information is received at block 404. At block 406, the authenticating information is sent to the authentication server to be verified as being associated with the worker. At block 408, the one-time key is received from the authentication server. The one-time key is displayed on a display at block 410. The one-time key can be presented as a barcode, a number sequence, a RFID, or the like. At block 412, a determination is made whether a predetermined amount of time has expired. The predetermined amount of time can be five minutes, ten minutes, or the like. When the predetermined amount of time has expired, the presentation of the one-time key is ended at block 414.

At block 416, transaction information associated with the one-time key is received from the authentication server. The transaction information can include a type of service to be performed or the like. At block 418, a determination is made whether a selection of an acknowledgment that the transaction information is correct is received. If the selection of the acknowledgment that the transaction information is correct is not received, the server is notified that the transaction information is incorrect at block 420. If the selection of the acknowledgment that the transaction information is correct is received, the transaction information is verified with the server at block 422.

Figure 5:
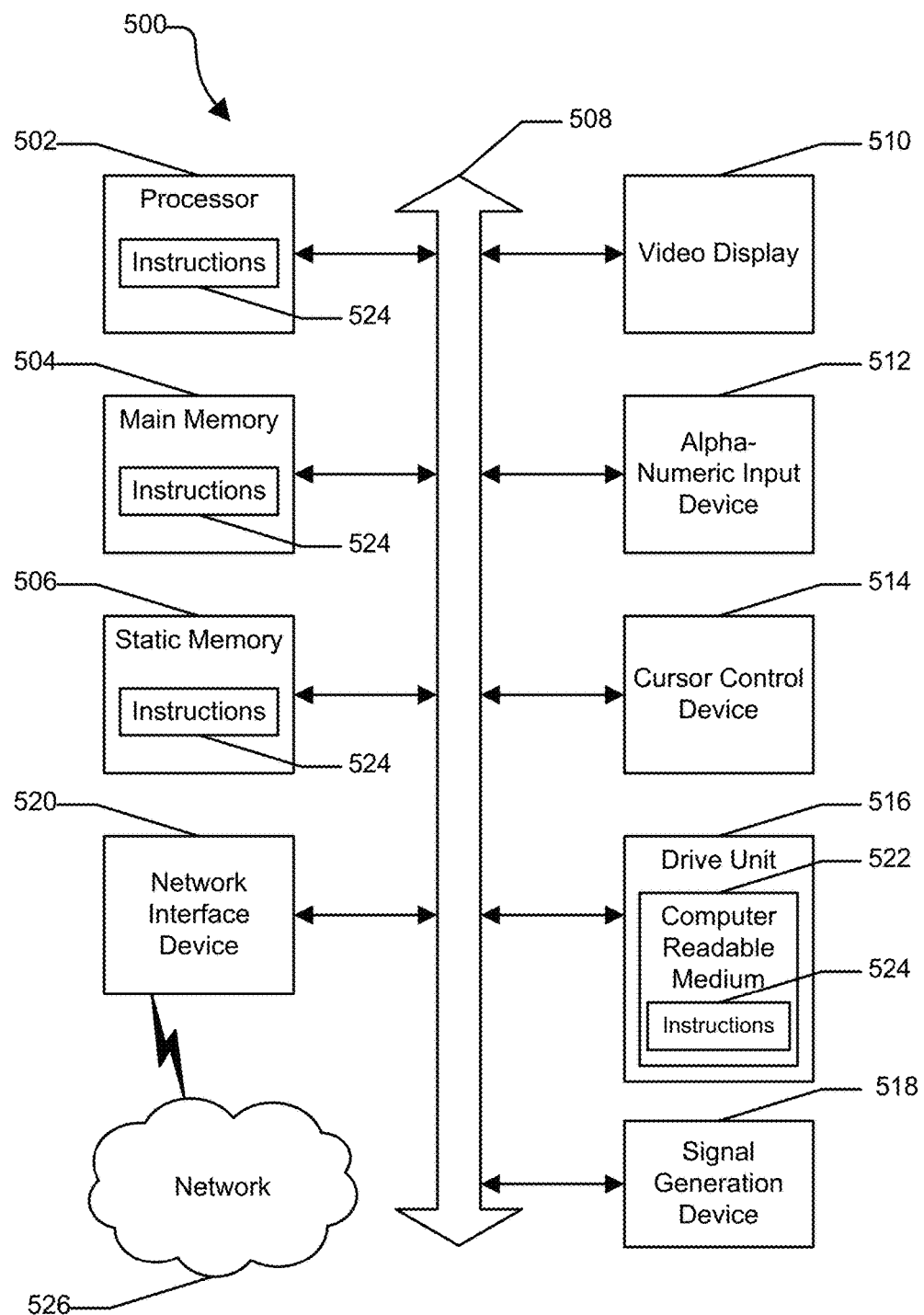
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
a memory that stores instructions;
a processor that executes the instructions to perform operations, the operations comprising:
transmitting a first set of instructions to cause a worker device to present a graphical representation of a first key on the worker device with a number sequence associated with the key;
receiving a second key and identification details from a customer device, wherein the second key indicates a type of service to be performed for the customer device;
transmitting, if the first key matches the second key received from the customer device, the identification details to the worker device; and
transmitting, in response to receipt of an acknowledgement of the identification details from the worker device, an authentication of the second key and the identification details to the customer device, wherein the authentication authorizes performance of the type of service indicated by the second key, wherein the acknowledgement further verifies that a worker possesses the worker device or verifies the location of the worker.

2. The system of claim 1, wherein the operations further comprise translating the first key into the graphical representation.

3. The system of claim 1, wherein the operations further comprise transmitting the first key and the graphical representation of the first key to the worker device.

4. The system of claim 1, wherein the operations further comprise determining if the acknowledgement of the identification details from the worker device has been received.

5. The system of claim 1, wherein the operations further comprise transmitting a second set of instructions to cause the worker device to stop presenting the graphical representation of the first key.

6. The system of claim 1, wherein the operations further comprise transmitting, if the first key does not match the second key, a notification indicating that the second key is invalid.

7. The system of claim 1, wherein the operations further comprise encrypting the first key.

8. The system of claim 1, wherein the operations further comprise generating the first key.

9. The system of claim 1, wherein the operations further comprise receiving a request for the first key.

10. The system of claim 1, wherein the operations further comprise receiving authentication information.

11. The system of claim 10, wherein the operations further comprise verifying that the authentication information is associated with the worker device.

12. The system of claim 1, wherein the operations further comprise deleting the first key after a period of time.

13. The system of claim 1, wherein the operations further comprise transmitting, if the acknowledgement is not received, a notification to the customer device indicating that the second key is invalid.

14. A method, comprising:
transmitting, by utilizing instructions from a memory that are executed by a processor, a first set of instructions to cause a worker device to present a graphical representation of a first key on the worker device with a number sequence associated with the first key;
receiving a second key and identification details from a customer device, wherein the second key indicates a type of service to be performed for the customer device;
transmitting, if the first key matches the second key received from the customer device, the identification details to the worker device; and
transmitting, in response to receipt of an acknowledgement of the identification details from the worker device, an authentication of the second key and the identification details to the customer device, wherein the authentication authorizes performance of the type of service indicated by the second key, wherein the acknowledgement further verifies that a worker possesses the worker device or verifies the location of the worker.

15. The method of claim 14, further comprising translating the first key into the graphical representation.

16. The method of claim 14, further comprising transmitting a second set of instructions to cause the worker device to stop presenting the graphical representation of the first key.

17. The method of claim 14, further comprising transmitting, if the acknowledgement is not received, a notification to the customer device indicating that the second key is invalid.

18. The method of claim 14, further comprising transmitting, if the first key does not match the second key, a notification indicating that the second key is invalid.

19. The method of claim 14, further comprising transmitting a token with the first key.

20. A computer-readable device comprising instructions, which, when loaded and executed by a processor, cause the processor to perform operations, the operations comprising:
transmitting a first set of instructions to cause a worker device to present a graphical representation of a first key on the worker device with a number sequence associated with the key;
receiving a second key and identification details from a customer device, wherein the second key indicates a type of service to be performed for the customer device;
transmitting, if the first key matches the second key received from the customer device, the identification details to the worker device; and
transmitting, in response to receipt of an acknowledgement of the identification details from the worker device, an authentication of the second key and the identification details to the customer device, wherein the authentication authorizes performance of the type of service indicated by the second key, wherein the acknowledgement further verifies that a worker possesses the worker device or verifies the location of the worker.

* * * * *